United States Patent Office 3,741,805
Patented June 26, 1973

3,741,805
CHLORINE STABLE COMPOSITION FOR CLEANING AND SANITIZING AND METHOD OF USE
Homer E. Crotty and Charles R. Coffey, Cincinnati, and Thomas C. Tesdahl, Forest Park, Ohio, assignors to Chemed Corporation, Cincinnati, Ohio
No Drawing. Application Apr. 23, 1970, Ser. No. 31,373, now Patent No. 3,666,679, which is a continuation-in-part of application Ser. No. 749,585, Aug. 2, 1968, now Patent No. 3,578,499. Divided and this application Aug. 10, 1971, Ser. No. 170,644
The portion of the term of the patent subsequent to May 11, 1987, has been disclaimed
Int. Cl. B08b 7/00; C11d 3/48
U.S. Cl. 134—4
10 Claims

ABSTRACT OF THE DISCLOSURE

An aqueous gelling composition for cleaning and sanitizing comprising (A) a Xanthan gum, (B) a diluent selected from the group consisting of $Na_2SO_4$ and NaCl, (C) a linear alkyl benzene sulfonate, (D) propylene glycol dispersing agent, (E) fluorescein dye, and (F) a chlorine release agent such as chlorinated trisodium phosphate, chlorinated isocyanurates, or sodium hypochlorite; and its method of use.

---

This application for United States Letters Patent is a division of application Ser. No. 31,373 filed Apr. 23, 1970, now U.S. Pat. No. 3,666,679, which in turn is a continuation-in-part of application Ser. No. 749,585 filed Aug. 2, 1968 and now U.S. Pat. No. 3,578,499.

The present invention relates to a gelling agent which when added to water forms a gel useful for stabilizing a chlorine release additive. More particularly, the present invention provides an improved chlorine stable gel, and a method for cleaning or sanitizing a variety of irregularly shaped surfaces by permitting a surface adhering layer of said gel to remain in place for a period of time sufficient for cleaning and sanitizing, after which the gel is removed by rinsing. After removal of a surface adhering film of applied chlorine-containing gel composition, a clean-sanitized surface remains.

Numerous cleaning and sanitizing compositions are available to the art. Typically, these composition appear in concentrated form for addition to a solvent such as water which may be then applied to a surface to be cleaned. Incidental to cleaning, these composition may include germicidal agents or related materials for sanitizing a surface being cleaned. A defect in conventional compositions used heretofore has been the high fluidity characteristic which upon application to, for example, vertical surfaces, results in the applied materials having a tendency to run and ineffectively clean the surface. Resultingly, in most instances, insubstantial contact time is permitted for adequate cleaning and sanitizing of surfaces to be cleaned.

Considerable interest in polysaccharides produced by the bacterial fermentation of carbohydrates has been exhibited in recent years. These polysaccharides, having properties which permit their use as thickening agents for water, have been used as foam enhancers for beer, as emulsion stabilizers for mayonnaise and the like, and as water thickening agents for use in secondary recovery operations carried out in the petroleum industry.

It has been known, as described in U.S. Pat. No. 3,383,307 that it is possible to make gels by adding a polysaccharide produced from carbohydrates by the action of bacteria of the genus Xanthomonas, to water at rather low levels such as from 0.05 to 5 weight percent based on the weight of water. Into this thickened water is added a salt of a trivalent metal such as aluminum sulfate and, if desired, a metallic promoter such as powdered zinc metal. The addition of a trivalent metal salt such as aluminum sulfate and a metallic promoter such as powdered zinc, to the polysaccharide-thickened water, results in gel formation.

It has now been found by practice of the present invention, that chlorine stability of a chlorine release additive is improved by using a particular polysaccharide-thickened water system. Appropriate additives for cleaning and sanitizing may be included as desired with the present gel which is applied as an adhering gel film to a surface to be cleaned and sanitized for a period of time affording adequate cleaning and sanitizing of the surface. Thereafter, the applied gel may be readily removed by rinsing with water.

Generally stated, the present invention provides a chlorine stable gelling composition including a particular gelling agent identified as anionic heteropolysaccharide characterized with high dilute solution viscosity, and if desired a neutral diluent, a wetting agent, a dispersing agent, and a dye or coloring additive. Upon addition in prescribed amounts to a suitable solvent such as water, the gelling composition forms a thixotropic or gelled mass which when appropriate additives including an available chlorine containing additive are introduced for cleaning or sanitizing may be readily applied as a thin adhering film of gel solution cleaner to a surface for cleaning and sanitizing thereof. The thin film is permitted to adhere to the surface for a period of time sufficient to provide effective cleaning and sanitizing after which period the thin film is removed by rinsing with water.

The present invention also provides a method for cleaning and sanitizing surfaces and particularly irregularly positioned wall or equipment surfaces disposed either overhead or vertical with reduced tendency for spillage and running of the cleaning composition as is typically encountered when using conventional solutions or detergent compositions.

The various components of the chlorine stable composition, when formulated, may be used for general cleaning when employed in a water solvent system although other less conventional solvents may be employed provided the necessary thixotropic or gel surface adhering characteristics are obtained in the composition applied to a surface to be sanitized or cleaned.

The gelling agent typically employed as a component of the present composition is generally one characterized with heat stability, pH stability, high shear stability, and high dilute solution viscosity. Such gelling agents are exemplified by those water soluble anionic heteropolysaccharide biopolymers having sufficiently high molecular weight such that dilute solutions thereof, such as 1 percent water solutions, may be characterized with a Brookfield Model LVF viscometer solution viscosity from about 1,500 to about 5,000 centipoises at 25° C. and preferably from about 2,500 to about 3,500 centipoises at 25° C. Such high molecular weight biopolymers are generally found to show improved resistance to chlorine attack over related low molecular weight polymers having lower dilute solution viscosity. A particular gelling agent found useful herein is polysaccharide type materials such as anionic heteropolysaccharide thickening agent manufactured by General Mills, Minneapolis, Minn., under the name "Biopolymer XB-23." This material, Xanthan gum produced by means of the species *Xanthomonas campestris*, is supplied as a minus 80 mesh tan powder having a 1% water solution viscosity of from about 2,000 to about 4,000 centipoises, and preferably about 2,500 to about 3,500 centipoises at 25° C. when measured with a Broofield Model LVF viscometer.

Other related water soluble materials may be employed such as those anionic heteropolysaccharide biopolymeric materials derived by microbial fermentation, and the like. Typically, these materials are water soluble while providing heat stability, pH stability, and high shear stability while retaining the ability to form a chlorine stable thixotropic or gelled mass when added to a suitable solvent such as water or the like. Those related materials having high molecular weight and hence high dilute solution viscosity and improved resistance to chlorine attack are generally preferred due to greater effectiveness herein.

Powder gelling compositions including the high dilute solution viscosity gelling agents described herein are found to provide longer lasting surface adherence properties to the present thixotropic mass or gel prepared therefrom using a chlorine release additive as a component of the gel. Moreover high dilute solution viscosity gelling agents impart greater retention of available chlorine to the present gel than is observed when a related gel is prepared using similar gelling agents except having lower dilute solution viscosity.

Generally, wide ranges of gelling agent may be included in formulating the present chlorine stable powder gelling composition which may appear as a concentrated formulation. Typically, however, the gelling agent is included in an amount from about 20 to about 60 parts by weight although if desired the gelling agent may be included in an amount up to about 100 parts by weight based on the weight of the powder gelling composition.

An optional component which may be included in the present chlorine stable powder gelling composition is a neutral diluent such as sodium sulfate, sodium chloride, and the like which may be added in any suitable amount up to 95 parts by weight and typically in an amount from about 40 to about 80 parts by weight based on the weight of the powder gelling composition. Various additional materials may be added as neutral diluents providing the materials characterize the present composition with a substantially neutral pH in the range of about pH 6 to about pH 8 while retaining the other desired properties of the composition while further retaining surface adhering properties of the thixotropic or gel cleaning solution derived from the powder gelling composition.

Another optional component which may be included in the present chlorine stable powder gelling composition is a wetting agent exemplified by a linear alkyl benzene sulfonate type material wherein the alkyl group may include from about 12 to about 14 carbon atoms. The wetting agent, where included, is desirably characterized as an anionic agent although it is recognized that nonionic surfactants may also be employed. One wetting agent found useful herein is the commercially available sodium sulfonate of dodecylbenzene. Wetting agents may be included in an amount up to about 10 parts by weight and preferably in an amount from about 1 to about 4 parts by weight based on the weight of the powder gelling composition.

Yet another optional component which may be included in formulating the present chlorine stable powder gelling composition is a liquid dispersing agent exemplified by propylene glycol or the like. The dispersing agent is found useful in formation of a composition having components uniformly dispersed throughout. The dispersing agent may be added in an amount up to about 10 parts by weight and desirably in an amount of about 1 to about 3 parts by weight based on the weight of the powder gelling composition.

A dye or coloring agent, although an optional component, is desirably added to the chlorine stable powder gelling composition to provide a suitable indicator for application and removal of a thin film or surface adhering gel. The amount of dye or coloring agent which is added in formation of the present composition is that sufficient to form a suitable indicating means by color contrast to effectively indicate the presence of a thin film of cleaning gel applied to a surface to be cleaned. Typically, a suitable dye found useful herein is fluorescein which may be added in an amount up to about 1 part by weight and preferably in an amount of about 0.1 to about 0.3 part by weight to the composition.

Although not required in the present composition, it is recognized that additional components such as filler materials, antiseptic materials, sanitizing materials, and the like may be usefully added provided these materials do not deleteriously affect formation of a thixotropic or gelled mass when the powder gelling composition is added to a suitable solvent such as water.

The various components used to formulate the present chlorine stable gelling composition may be combined by uniformly mixing the various components until a substantially uniform blend is obtained.

The present chlorine-stable powder gelling composition may be used to form an effective gel or gel solution cleaner of which the gelling composition forms a component. A second component included in the present gel solution cleaner is a chlorine release additive such as chlorinated trisodium phosphate, chlorinated isocyanurates, sodium hypochlorite, and the like. A third component included in the present gel solution cleaner is a solvent, principally water for reasons of economy although other suitable solvents may be employed provided the necessary gel and chlorine stability factors are not significantly altered.

A concentrate or blend of chlorine stable powder gelling composition may be added to a suitable solvent such as water or the like for formation of a chlorine stable thixotropic mass or gel. The concentrated or blended powder gelling composition may be added in an amount up to about 10 percent by weight and desirably in an amount from about 0.1 percent up to about 5 percent by weight based on the total weight of water. Preferably, the powder gelling composition is added in an amount from about 0.5 percent up to about 3 percent by weight based on the total weight of water desirably at a temperature of about 180° F. to form a useful surface adhering film when applied as a thixotropic mass.

Thereafter, the gel solution is desirably cooled prior to dissolving the chlorine release component therein although the chlorine release additive may be added to the gel at the gel solution preparation temperature if desired. The temperature to which the gel is cooled for addition of the chlorine release component is preferably the temperature at which the gel cleaner solution is to be used for cleaning and sanitizing. In many applications a useful temperature therefor is in a range from about 100 to about 70° F. A typical use temperature is room temperature (i.e., about 70° F.).

The chlorine release component may be added in an amount such that from about $200 \times 10^{-6}$ to about $10,000 \times 10^{-6}$ part by weight of available chlorine is added, and preferably from about $200 \times 10^{-6}$ to about $2,000 \times 10^{-6}$ part, based on one part by weight of water.

The gel solution cleaner may be formed by uniformly mixing the various components thereof until a substantially uniform mixture is obtained.

Various additional materials may be added to the thixotropic mass such as for example, acidic or alkaline materials for cleaning and sanitizing purposes, as well as disinfectant materials all having water soluble properties. These materials are added in any effective amount as desired. Various other materials such as deodorizing agents and the like may be included in the thixotropic mass if desired. Examples of sanitizing agents customarily employed in related compositions and found useful herein include chlorinated phenyl derivatives and the like as well as related halogen substituted phenol derivatives and halogens either elemental or complexed.

After the thixotropic mass or gel has been prepared with agents for cleaning and sanitizing, the gel is available for application to a surface which is to be cleaned or sanitized. Application of the thixotropic mass may be by brushing or spraying although any suitable means such as roll application or the like may be employed. After application of a surface adhering gel to a surface to be cleaned and sanitized, the film of gel is permitted to adhere to the surface for a desired period of time sufficient to provide adequate and effective cleaning and sanitizing actions. It is typically found that a film of gel may be applied and retained in position for a period of time such as, for example, about 30 to about 60 minutes, although shorter or longer periods may be provided depending upon the strength of the particular components of gel and the degree of cleaning and sanitizing required.

After the cleaning and sanitizing period, the thin film of gel may be removed by any suitable means. A desirable method for removing the applied film is by application of water which may be either sprayed or brushed over the surface of the applied film. Various other means may be used to destroy the film of surface adhering gel for removal of the film from the surface to which it is applied. For example, the gel may be broken or destroyed by addition of strongly alkaline materials such as a strong solution of sodium hydroxide having a pH of about 12.

It is generally found that after application of the present gel film and removal thereof from a surface, the surface is effectively sanitized and substantially cleaned.

In order to further illustrate the present invention, the following examples are given wherein all parts are by weight unless otherwise indicated:

EXAMPLE I

A powder gelling composition is prepared by blending in a mixer the following ingredients in the order and amount listed:

| Ingredient: | Parts by weight |
| --- | --- |
| Kelzan M Gum (Xanthomonas hydrophilic colloid) | 40.00 |
| Sodium sulfate | 56.85 |
| Sodium linear dodecylbenzene sulfonate (100%) | 2.0 |
| Propylene glycol | 1.0 |
| Fluorescein dye | 0.15 |

Two parts by weight of this powder gelling composition prepared was dissolved in 100 parts of 180° F. water to form a thick gel solution. To the resulting gel solution at 100° F. was added chlorinated trisodium phosphate sufficient to provide 600 p.p.m. (parts per million) of available chlorine. After 1 hour the available chlorine content was found to be about 75 p.p.m.

EXAMPLE II

The procedure of Example I was repeated except "Kelzan M Gum" was replaced by a corresponding amount of a polysaccharide gelling agent characterized as having a 1% solution viscosity of 3000 centipoises at 25° C. This added gelling agent is identified as an anionic heteropolysaccharide thickening agent manufactured by General Mills and identified as "Biopolymer XB-23." To the resulting gel solution at 100° F. was added chlorinated trisodium phosphate sufficient to provide 600 p.p.m. of available chlorine. After 1 hour the available chlorine content was found to be 264 p.p.m. The resulting warm alkaline gel solution was sprayed onto the metal meat processing equipment (conveyers, neoprene cutting boards, band saws, stainless steel tables) in a meat processing plant cutting room area. The gel was allowed to cling to the surfaces for about 30–40 minutes, then rinsed off with high pressure warm water. The cleaning results were found to be excellent and the surfaces were free of meat fat soil and gel cleaner.

EXAMPLE III

Two parts by weight of Kelzan M Gum containing powder gelling composition prepared as in Example I was dissolved in 100 parts of 180° F. water to form a thick gel solution. To the resulting gel solution at room temperature (i.e., approximately 70° F.) was added an amount of chlorinated trisodium phosphate sufficient to provide 600 p.p.m. of available chlorine in the thus formed gelled cleaner-sanitizer. The amount of available chlorine retained in the gel at various times over approximately 3.5 hours was determined using standard titration testing therefor known in the art. Test results are shown in Table A below.

EXAMPLE IV

Two parts by weight of Biopolymer XB-23 anionic heteropolysaccharide containing powder gelling composition prepared as in Example II was dissolved in 100 parts of 180° F. water to form a thick gel solution. To the resulting gel solution at room temperature (i.e., approximately 70° F.) was added an amount of chlorinated trisodium phosphate sufficient to provide 600 p.p.m. of available chlorine in the thus formed gelled cleaner-sanitizer. The amount of available chlorine retained in this gel at various times over approximately 3.5 hours was determined using titration testing as in Example III. Test results for Examples III and IV are shown in Table A below.

TABLE A

| | Available chlorine, p.p.m. | |
| --- | --- | --- |
| Time since gelled cleaner prepared, minutes | Example III gelled cleaner (Kelzan M gelling agent) | Example IV gelled cleaner (Biopolymer XB-23 gelling agent) |
| 0 | 600 | 600 |
| 10 | 451 | 620 |
| 40 | 339 | 414 |
| 70 | 225 | 300 |
| 100 | 188 | 300 |
| 220 | 57 | 151 |

It is noted that while good stability of chlorine (i.e., time retention of available chlorine) is observed for the gelled cleaner of Example III using Kelzan M as gelling agent, even better chlorine stability is observed for the Example IV gelled cleaner using Biopolymer XB-23 as gelling agent. 200 or more p.p.m. chlorine is observed to be available for a longer period in the instance of Biopolymer XB-23 than for Kelzan M using the related gel cleaner formulations of Examples III and IV.

Similarly, surface adhering properties of the Example IV gelled cleaner are observed to be even longer lasting than the Example III gelled cleaner. This is attributed to increased resistance to chlorine attack for Biopolymer XB-23 having higher dilute solution viscosity (e.g., 3000 cp. for 1% solution at 25° C.) and higher molecular weight than Kelzan M (e.g., 700 cp. for 1% solution at 25° C.).

EXAMPLE V

A powder gelling composition is prepared by blending in a mixer the following ingredients in the order and amounts listed:

| Ingredient: | Parts by weight |
| --- | --- |
| Sodium sulfate | 56.85 |
| Biopolymer XB-23 | 40.00 |
| Linear alkylphenol ethylene oxide adduct (100%), cloud point, 1%, 75°–212° F. | 2.0 |
| Propylene glycol | 1.0 |
| Fluorescein dye | 0.15 |

EXAMPLE VI

A powder gelling composition is prepared by blending in a mixer the following ingredients in the order and amounts listed:

| Ingredient: | Parts by weight |
| --- | --- |
| Sodium sulfate | 56.85 |
| Biopolymer XB-23 | 40.0 |
| Sodium N-methyl, N-oleoyl taurate (100%) | 2.0 |
| Propylene glycol | 1.0 |
| Fluorescein dye | .15 |

EXAMPLE VII

A powder gelling composition is prepared by blending in a mixer the following ingredients in the order and amounts listed:

| Ingredient: | Parts by weight |
|---|---|
| Sodium chloride | 56.85 |
| Biopolymer XB-23 | 40.00 |
| Sodium linear dodecyl benzene sulfonate (100%) | 2.0 |
| Ethylene glycol | 1.0 |
| Fluorescein dye | 0.15 |

EXAMPLE VIII

A powder gelling composition is prepared by blending in a mixer the following ingredients in the order and amounts listed:

| Ingredient: | Parts by weight |
|---|---|
| Sodium sulfate | 56.85 |
| Biopolymer XB-23 | 40.0 |
| Sodium linear alkyl naphthalene sulfonate (100%) | 2.0 |
| Propylene glycol | 1.0 |
| Fluorescein dye | .15 |

EXAMPLE IX

Two parts by weight of the powder gelling composition prepared in Example V is dissolved in 100 parts of 180° F. water to form a thick gel solution. Chlorinated isocyanurate is dissolved in the gel solution at 70° F. in an amount sufficient to provide 2000 p.p.m. available chlorine. The resulting gel solution is sprayed onto soiled metal and concrete surfaces in a meat plant smokehouse. The gel is allowed to cling to the soiled walls and ceilings for about 20–30 minutes, then the surfaces are rinsed with warm water to remove the gel and soil. The cleaning results are found to be excellent and the surfaces are free of gel and soil.

EXAMPLE X

Two parts by weight of the powder gelling composition prepared in Example VI is dissolved in 100 parts of 180° F. water to form a thick gel solution. Chlorinated isocyanurate is dissolved in the gel solution at 100° F. in an amount sufficient to provide 500 p.p.m. available chlorine. The resulting warm gel solution is sprayed onto metal meat processing (conveyors, neoprene cutting boards, band saws, stainless steel tables) in a meat processing plant cutting room area. The gel is allowed to cling to the surfaces for about 30–40 minutes, then rinsed off with high pressure warm water. The cleaning results are found to be excellent and the surfaces are free of meat fat soil and gel cleaner.

EXAMPLE XI

Two parts by weight of the powder gelling composition prepared in Example VII is dissolved in 90 parts of 180° F. water to form a thick gel solution. Sodium hypochlorite is dissolved in the gel solution at 70° F. in an amount sufficient to provide 600 p.p.m. of available chlorine. The resulting gel solution is sprayed onto metal surfaces containing protein, lime deposits, and metal oxides. After the gel solution has clung to the metal surface for about 15–30 minutes, the surfaces are rinsed with warm water. The cleaning results are found to be excellent with brightening of the metal, dissolving of the metal oxides, and softening and dissolving of the protein soil.

EXAMPLE XII

Two parts by weight of the powder gelling composition prepared in Example VIII is dissolved in 100 parts of 180° F. water to form a thick gel solution. Chlorinated trisodium phosphate is dissolved in the gel solution at 70° F. in an amount sufficient to provide 1500 p.p.m. available chlorine. The resulting alkaline gel solution is sprayed onto soiled metal and concrete surfaces in a meat plant smoke house. The gel is allowed to cling to the soiled walls and ceilings for about 20–30 minutes, then the surfaces are rinsed with warm water to remove the gel and soil. The cleaning results are found to be excellent and the surfaces are free of gel and soil.

It is understood that the foregoing detailed description is given merely by way of illustration and that many variations may be made therein without departing from the spirit and scope of this invention.

We claim:
1. A chlorine stable gel which comprises:
   (A) water;
   (B) from about 0.1 to about 10 percent by weight, based on the weight of the water, of a powder gelling composition comprising Xanthan gum produced by means of the species *Xanthomonas campestris* and characterized with heat stability, pH stability, high shear stability, and 1 percent water solution viscosity of about 2,000 to about 4,000 centipoises at 25° C.;
   (C) a chlorine release additive present in an amount from about $200 \times 10^{-6}$ to about $10,000 \times 10^{-6}$ part by weight of available chlorine, based on one part by weight of water.

2. The chlorine stable gel of claim 1 wherein the chlorine release additive is included in an amount from about $200 \times 10^{-6}$ to about $2,000 \times 10^{-6}$ part by weight of available chlorine per part by weight of water.

3. The chlorine stable gel of claim 1 wherein the powder gelling composition comprises:
   (A) from about 20 to about 100 parts by weight of Xanthan gum produced by means of the species *Xanthomonas campestris* as the gelling agent;
   (B) from about 40 to about 95 parts by weight of a neutral diluent selected from the group consisting of sodium sulfate and sodium chloride;
   (C) from about 1 to about 10 parts by weight of a linear alkyl benzene sulfonate wherein the alkyl group includes from about 12 to about 14 carbon atoms;
   (D) from about 1 to about 10 parts by weight of propylene glycol liquid dispersing agent; and
   (E) up to about 1 part by weight of fluorescein dye.

4. The chlorine stable gel of claim 1 wherein the chlorine release additive is chlorinated isocyanurate.

5. The chlorine stable gel of claim 1 wherein the chlorine release additive is chlorinated trisodium phosphate.

6. The chlorine stable gel of claim 1 wherein the chlorine release additive is sodium hypochlorite.

7. The chlorine stable gel of claim 3 wherein in the powder gelling composition:
   (A) the gelling agent is present in an amount from about 20 to about 60 parts by weight;
   (B) the neutral diluent is present in an amount from about 40 to about 80 parts by weight;
   (C) the linear alkyl benzene sulfonate is present in an amount from about 1 to about 4 parts by weight;
   (D) the dispersing agent is present in an amount from about 1 to about 3 parts by weight; and
   (E) the dye is present in an amount from about 0.1 to about 0.3 part by weight.

8. The chlorine stable gel of claim 7 wherein there is included from about 0.1 to about 0.5 percent by weight of the gelling composition.

9. The chlorine stable gel of claim 7 wherein there is included from about 0.5 to about 3 percent by weight of the gelling composition.

10. A method for cleaning and sanitizing surfaces which comprises:

(A) applying the gel of claim 1 to a surface to be cleaned and sanitized;
(B) permitting a film of applied gel of Step (A) to remain for up to about 60 minutes; and
(C) removing the applied gel film.

References Cited

UNITED STATES PATENTS

| | | | |
|---|---|---|---|
| 3,578,499 | 5/1971 | Crotty et al. | 134—4 |
| 3,666,679 | 5/1972 | Crotty et al. | 252—316 |

OTHER REFERENCES

Sloneker et al., Canadian J. of Chem., vol. 40 (1962), pp. 2066–2071.

MORRIS O. WOLK, Primary Examiner

D. G. MILLMAN, Assistant Examiner

U.S. Cl. X.R.

21—58; 252—106, 132, 316